United States Patent [19]

Wilder

[11] 4,329,060

[45] May 11, 1982

[54] NON-CONTACTING WORKPIECE GAUGING SYSTEM

[75] Inventor: Joseph Wilder, Princeton, N.J.

[73] Assignee: Sangamo Weston, Inc., Norcross, Ga.

[21] Appl. No.: 140,337

[22] Filed: Apr. 14, 1980

[51] Int. Cl.³ .............................................. G01B 11/14
[52] U.S. Cl. .................................. 356/375; 250/203 R
[58] Field of Search ................................ 356/375–376, 356/371, 381–382, 1, 4, 400; 250/203 R, 208, 577–578, 560–561

[56] References Cited
U.S. PATENT DOCUMENTS

| | | | |
|---|---|---|---|
| 2,969,018 | 1/1961 | Erst et al. ............................. | 250/578 |
| 3,016,464 | 1/1962 | Bailey .................................... | 356/375 |
| 3,180,205 | 4/1965 | Heppe et al. ......................... | 250/202 |
| 3,571,796 | 3/1971 | Brugger ................................ | 250/578 |
| 3,657,547 | 4/1972 | Mansfield ............................. | 250/578 |
| 3,997,795 | 12/1976 | Pohl ..................................... | 250/578 |
| 4,053,234 | 10/1977 | McFarlane ........................... | 356/381 |

OTHER PUBLICATIONS

Smith et al. "Optical Alignment Apparatus," IBM Tech. Disclosure Bull., vol. 18, #2, 775, pp. 499–500.

*Primary Examiner*—William H. Punter
*Attorney, Agent, or Firm*—Dale Gaudier

[57] ABSTRACT

A system for finding the position of a workpiece surface relative to a reference through non-contact gauging. The system uses a radiant energy beam projected such that an illuminated spot moves along the workpiece surface with movement of that surface relative to the reference along a measurement direction. An array-type image detector, which is out of physical contact with the workpiece, detects the illumination at each of a number of small areas of the workpiece surface and generates signals representative of the detected illumination. These signals are converted into a test signal which is a function of the difference in overall illumination between larger areas of the workpiece surface. A reference signal is produced and stored for two known positions of a workpiece surface. The test signal and the reference signal are combined with each other to produce a measurement signal indicative of the position of the workpiece surface relative to the reference.

17 Claims, 7 Drawing Figures

NON-CONTACTING WORKPIECE GAUGING SYSTEM

BACKGROUND AND SUMMARY OF THE INVENTION

The invention relates to the field of workpiece gauging systems, and more particularly to a non-contact gauging system of this type.

In industrial assembly operations it is desirable to know the position of a surface to decide, for example, if the workpiece size meets specifications within acceptable tolerances. Such a gauging operation must be done quickly and accurately in an environment where it is often undesirable to make physical contact with the workpiece, especially where the workpiece has rough surfaces and/or rough edges which reduce the precision and repeatability of any measurements made by physically contacting the workpiece. In addition, it is desirable to do such gauging by automated apparatus to increase the gauging speed and minimize errors as compared with manual gauging.

Various techniques have been proposed for performing non-contact measurement of parts in an industrial environment. One example is referred to in Waters, J. P., "Gauging by Remote Image Tracking," *Optical Engineering*, Volume 18, No. 5, pages 473–477, September–October 1979, and involves an optical triangulation technique. As proposed therein, a spot of light is projected from a gauge head onto the part being gauged. An image of this spot is focused on the center of a tracking photodetector. If the part is moved in a direction perpendicular to the projection axis, the focused spot on the surface of the photodetector will move as the surface curvature of the part changes. Various signals are derived from the photodetector output and used to drive the system to a system null. Another gauging system is proposed in U.S. Pat. No. 3,994,589. The patent refers to measuring the portion of an illuminated spot on a workpiece surface which is contained within a predetermined aperture and using this as an indication of the position of the illuminated surface. While such proposals may be useful in some environments, a need remains for an accurate, fast, reliable and relatively inexpensive system for finding the position of a workpiece relative to a reference. The instant invention is directed to meeting that need.

According to the invention, a method of gauging a workpiece surface and a system for carrying out the method are disclosed, in which an arbitrary reference is established by placing a surface at one or more known positions, illuminating a spot on that surface with a radiant energy source, remotely detecting the illumination of that surface with an illumination measuring device and producing, in response to the detected illumination, a reference signal which is, in effect, a measure of the system response to the known position or positions of the surface. To find the unknown position of a workpiece surface relative to the arbitrarily established reference, the workpiece surface is illuminated with the radiant energy beam and the illumination measuring device detects the illumination of the workpiece surface to produce signals which are converted to a test signal. The test signal emphasizes the desirable components of the illumination measured with the measuring device and de-emphasizes the undesirable components of the measurement. This test signal is combined with the reference signal to produce a measurement signal indicative of the position of the workpiece surface relative to the reference. This measurement signal is used in various ways as a representation of the sought position of the workpiece surface. The geometric relationship between the radiant energy beam and the workpiece surface is such that the illuminated spot moves along the workpiece surface with movement of the workpiece surface relative to the reference along a measurement direction.

The radiant energy source may be a source of a light beam, either coherent or non-coherent, or a source of electro-magnetic energy in a spectrum outside the visible one. The illumination measuring device may be, for example, a solid state array scanner, or an Image Dissector or a Vidicon device, or another similar array-type imaging device which is responsive to the particular type of radiation of the radiant energy source.

The illumination measuring device detects the illumination at each of a number of small areas on the workpiece surface to produce respective initial signals related to the illumination levels of the respective small areas of the workpiece surface. These initial signals are converted to a test signal which is a function of the difference in overall illumination between selected larger areas of the workpiece surface. It is this test signal which is combined with the reference signal to produce the measurement signal indicative of the sought position of the workpiece relative to the reference.

As discussed in detail below, other important aspects of the invention relate to the types of signals which are generated at various stages of the gauging process, to the way these signals are combined with each other and with other signals, and to the way the final measurement signal is produced and utilized, these aspects of the invention contributing to making the system less sensitive to extraneous, undesirable influences and more responsive to what is in fact sought: the position of the workpiece surface relative to the reference along a measurement direction.

DETAILED DESCRIPTION

Figure 1:
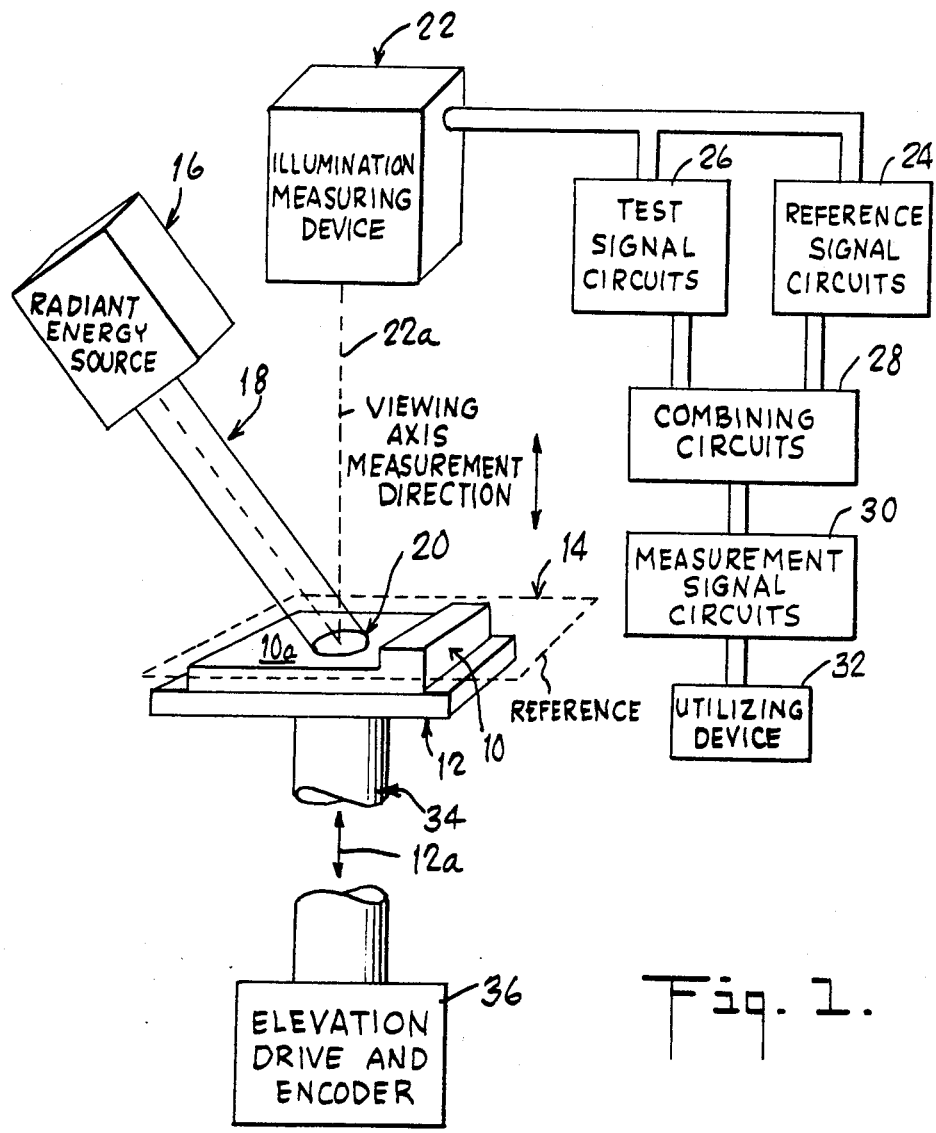
FIG. 1 is a perspective view and block diagram illustrating an embodiment of the invention.

Referring to FIG. 1, a workpiece 10, including a top surface 10a, is supported on a platform 12 which is movable in a vertical plane, as indicated by arrows 12a. The invention relates to finding the position of that surface 10a relative to a reference which may be a point, a surface, or a plane as indicated at 14 in FIG. 1. More particularly, what is desired is the distance of the surface 10a, along a measurement direction which in this case is parallel to a viewing axis 22a, from the reference. A radiant energy source 16 produces a radiant energy beam 18 which illuminates a spot 20 on the workpiece surface 10a. The geometric relationship between the radiant energy beam 18 and the workpiece surface 10a is such that the spot 20 moves along the workpiece surface 10a with movement of that surface up or down, along the measurement direction, relative to the reference plane 14.

An illumination measuring device 22 views the surface 10a along viewing axis 22a. The field of view of the device 22 typically includes an area larger than the illuminated spot 20 and may in fact include all of the surface 10a. The device 22 detects the illumination level at each of a number of small areas on the surface 10a and produces respective initial electrical signals related to the illumination levels of these small areas. These initial signals are supplied to either reference signal circuits 24 or test signal circuits 26, depending on whether the system is in a calibration mode or in a gauging mode.

When the system is in the calibration mode, the platform 12 is moved to a known position along axis 12a. For example, the platform 12 can be mounted, through a vertical shaft 34, on an elevation drive and encoder 36 which moves the platform 12 up and down the axis 12a and produces electrical signals indicative of the position of the platform 12. When the platform 12 is at a known position along the axis 12a, a workpiece of known thickness along the viewing axis is placed on the platform, and a spot on the workpiece is illuminated by the source 16. The initial electrical signals from the device 22 are supplied to the reference signal circuits 24 where they are converted into a first calibration signal related to differences in the overall illumination of larger areas of the illuminated surface. A similar second calibration signal is derived after either replacing the reference workpiece of known thickness with another reference workpiece of a second known thickness or by moving the platform 12 up or down by a known distance. The first and second calibration signals are combined with each other to derive the desired reference signal.

Assuming that the system has already gone through a calibration mode and is placed in a gauging mode, the reference signal circuits 24 contain a reference signal, and the initial signals from the device 22 are supplied only to the test signal circuits 26. These circuits convert the initial signals to a test signal which is a function of the difference in overall illumination between areas of the surface 10a which areas are substantially larger than the individual small areas the illumination of which is individually measured by the device 22. The test electrical signal from circuits 26 and the previously stored reference signal from circuits 24 are combined in combining circuits 28 to produce a measurement signal indicative of the position of the workpiece surface 10a relative to the reference 14. The measurement signal may be stored in measurement signal circuits 30 for further use and/or may be supplied to a utilizing device 32 for use in operations which depend in some way on a signal representative of the position of the workpiece surface 10a relative to the reference 14.

Figure 2:
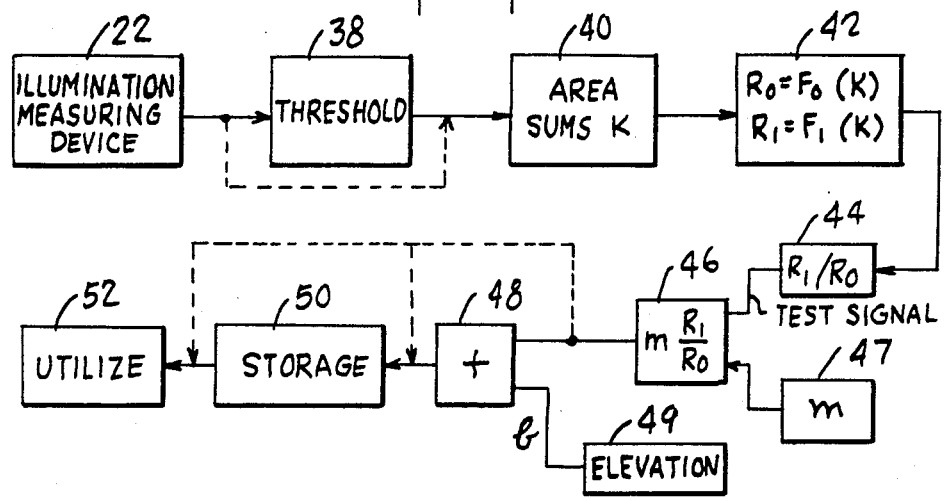
FIG. 2 is a block diagram illustrating the operation of the embodiment of FIG. 1.
Figure 3:
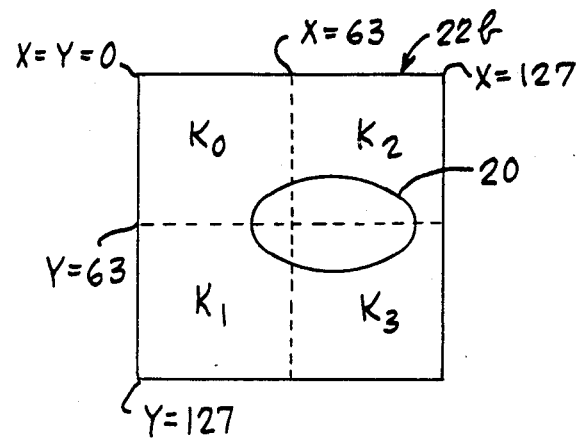
FIG. 3 is a diagram useful in explaining the operation of the invention.

Referring to FIGS. 2 and 3, the illumination measuring device 22 has, for instance, a rectangular field of view as illustrated at 22b in FIG. 3, and this field of view 22b is divided into four equal quadrants labeled $K_0$ through $K_3$. The illuminated spot 20 is typically unequally divided between these four quadrants. The purpose of the illumination measurement device 22 in this embodiment of the invention is to produce initial electrical signals which represent the illumination levels at respective points or picture elements ("pixels") which correspond to small areas within the field of view 22b. These pixels may be uniformly distributed within the field of view 22b and may be in the form of, for example, a 128×128 array of such pixels. Assuming that there is a sufficient difference between the ambient radiant energy and the radiant energy beam 18 (either in intensity or in type of radiant energy), the device 22 produces one kind of initial electrical signal for pixels which are in the field of view 22b but are outside the illuminated spot 20 and another type of initial electrical signal for pixels which are within the illuminated spot 20.

One example of a suitable device 22 is a solid state array scanner made by General Electric Corporation under the name G.E. 2200 camera. Another example is an "Image Dissector" device, which provides real time, random access scanning of its field of view in the sense that any point within the field of view can be accessed at any time. Yet another example is a "Vidicon" device which scans an image of its field of view with an electron beam and has a preset scanning sequence. A particular example is an optical device available from Schlumberger/EMR Photoelectric under the designation Model 658/659 Series. Such a device may, for example, produce an initial electrical signal of low voltage level for a pixel outside the illuminated spot 20 and of a higher voltage level for a pixel inside the spot 20, to thereby produce an initial electrical signal for each of the scanned points or small areas of the 128×128 array.

Each initial electrical signal is in the form of an 8-bit electrical signal representing 256 shades of brightness, with decimal 0 representing minimum brightness and decimal 255 representing maximum brightness. The set of 128×128 initial electrical signals from the device 22 may be, but need not be, thresholded at 38 (FIG. 2) such that, for example, the signals from device 22 which are below a certain voltage level value are considered to be 0 signals and those above a certain voltage value are considered to be 1 signals. Alternatively, they may remain as 256-value signals and may be treated as such in subsequent steps of the process. Still alternatively, the output of the device 22 (e.g. G.E. camera 2200), which is an analog signal, may be thresholded directly into signals representing a 1 or a 0 for each array point or small area, without an 8-bit A/D converter.

At 40 in FIG. 2, the output of device 22 is summed over an area K such that four signals are generated, each related to the total level of illumination at a respective one of the areas $K_0$ through $K_3$ illustrated in FIG. 3. As indicated, the four sums K may be in terms of the direct 8-bit output of the device 22 or they may be in terms of the thresholded output of 38. If the surface 10a of the workpiece 10 is considered to be in or parallel to an XY plane and if, as illustrated in FIG. 3, the field of view of device 22 is considered to be divided into an array from 0 to 127 in each of the X and Y directions as illustrated, the area sum $K_0$ is the sum of the intensities of the pixels having coordinates X from 0 to 63 and Y from 0 to 63, the sum $K_1$ is the sum of the intensities of the pixels having X coordinates from 0 through 63 and Y coordinates from 64 through 127, the sum $K_2$ is for X coordinates 64 through 127 and Y coordinates 0 through 63 and the sum $K_3$ is for X coordinates 64 through 127 and Y coordinates 64 through 127. At 42, the preliminary signals $R_0$ and $R_1$ are generated as respective functions of the area sums K. For example, the preliminary signal $R_0$ may be the sum of the four signals K, while the signal $R_1$ may be the sum of the signals $K_0$ and $K_1$ minus the sum of the signals $K_2$ and $K_3$. At 44, the ratio of the preliminary signals $R_1$ and $R_0$ is generated, to thereby generate the test electrical signal discussed above, and at 46 this test electrical signal is combined (e.g., multiplied or weighted) by a first reference signal designated m from a storage 47, to produce a measurement or gauging signal. This measurement signal may, but need not, be supplied to 48 where it is combined with (e.g., added to) a second reference signal (b) from a storage 49. This second reference signal represents the level of the platform 12, as supplied, for example, by the elevation drive and encoder 36. The resulting measurement signal may, but need not, be stored at 50. It is utilized at 52.

Figure 4:
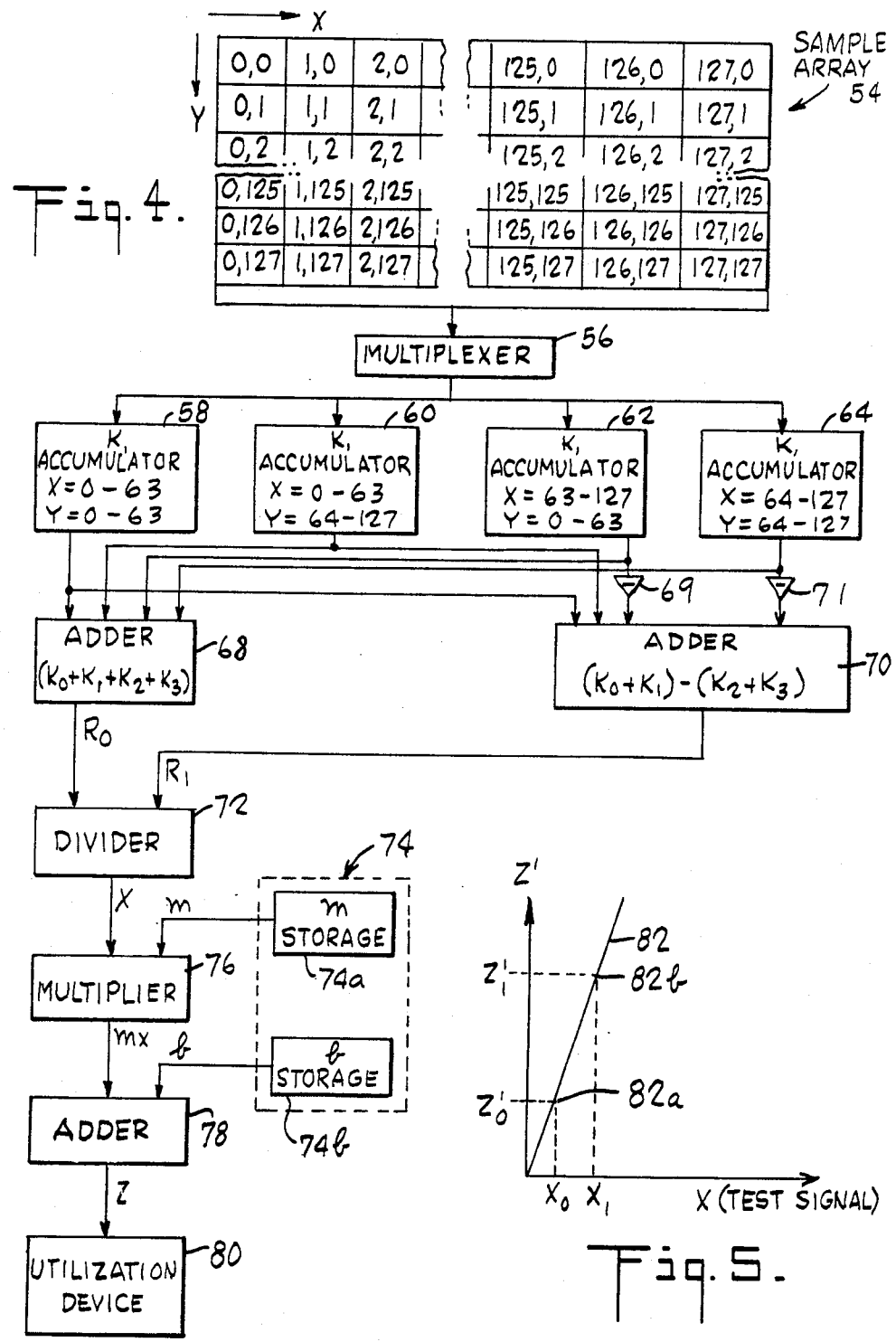
FIG. 4 is a more detailed block diagram illustrating an embodiment of the invention.

An exemplary embodiment of the invention discussed above in connection with FIGS. 1-3 is illustrated in FIG. 4. A sample array 54 has 128×128 cells corresponding respectively to the 128×128 pixels of the pixel array discussed in connection with FIG. 3. Thus, the sample array cell labeled 0,0 corresponds to the pixel having X,Y coordinates 0,0, the sample array cell labeled 1,0 corresponds to the pixel, in FIG. 3, having X,Y coordinates 1,0, etc. Each of the cells of the sample array 54 stores an initial electrical signal related to the illumination level at its corresponding pixel on the surface of the workpiece, as measured with the illumination measuring device 22 and, optionally, thresholded by threshold device 38 as discussed in connection with FIG. 2. The cells of sample array 54 can be storage registers, or the entire sample array may be a 128×128 random access memory where each cell has, for example, a capacity of 8 bits and the cells are appropriately loaded from the output of the illumination measuring device 22 (optionally after thresholding).

Once the initial electrical signals for the entire array of 128×128 pixels are stored in the sample array 54, the contents of the sample array are read out in any suitable order and supplied to a multiplexer 56. Multiplexer 56 selectively feeds accumulators 58, 60, 62 and 64, each of which accumulates the initial electrical signals supplied to it (e.g., by adding all the 8-bit signals supplied to it). In particular, the multiplexer 56 supplies the accumlator 58 with the contents of only those cells of the sample array 54 which have X coordinates ranging from 0 through 63 and Y coordinates similarly ranging from 0 through 63. Keeping in mind the discussion in connection with FIGS. 2 and 3, it can be seen that the accumulated signal in accumulator 58 corresponds to the area sum for area $K_0$ in FIG. 3. Similarly, accumulator 60 is supplied by multiplexer 56 with the contents of only those cells of the sample array 54 which have X,Y coordinates corresponding to area $K_1$. Similarly, multiplexer 56 supplies to accumulators 62 and 64 the contents of the cells of sample array 54 such that the accumulated signals correspond, respectively, to the area sum $K_2$ and the area sum $K_3$.

The accumulator circuits 58 through 64 are connected to adder circuits 68 and 70 as indicated. In particular, adder circuit 68 receives the direct outputs of all four of the accumulators, to thereby produce at its output a signal labeled $R_0$ as discussed above in connection with FIGS. 2 and 3, the adder 70 is connected directly to the output of accumulators 58 and 60 but is connected to the outputs of accumulators 62 and 64 through respective inverters 69 and 71, to thereby produce at its output a signal labeled $R_1$ as discussed above in connection with FIGS. 2 and 3.

A divider circuit 72 divides the signal $R_1$ by the signal $R_0$ to produce at its output a signal labeled X which is the test electrical signal referred to above in connection with FIGS. 2 and 3. The reference electrical signal discussed earlier is supplied by a circuit generally indicated at 74 which may comprise a storage device 74a for the signal m discussed earlier, and a storage device 74b for a signal b which is the same as the elevation signal discussed in connection with block 49 in FIG. 2. The test electrical signal from the output of divider circuit 72 and the reference electrical signal from circuit 74 are combined with each other, as shown in FIG. 4, by a multiplier circuit 76 which multiplies the test electrical signal X by the reference electrical signal m and outputs the resulting product signal mX into an adder circuit 78 which adds the contents of the storage device 74b to the product signal mX. The output of the adder circuit 78 is a signal labeled Z which is the measurement signal discussed above indicative of the position of the workpiece surface relative to a reference. This measurement signal is supplied to a utilization device 80 which may or may not include suitable storage facilities.

Figure 5:
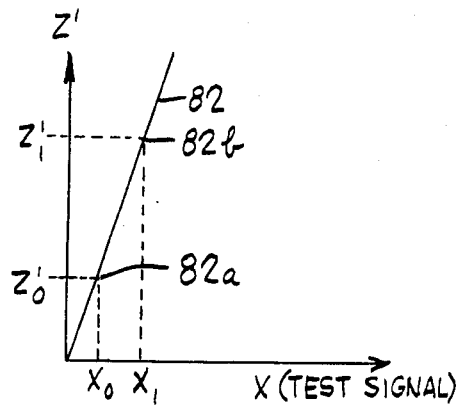
FIG. 5 is a graph useful in explaining the operation of the invention.

With reference to FIG. 5, the significance of the reference signal m and its elevation component signal b may be appreciated by considering the relationship between the measurement signal Z' and the position of the illuminated spot 20 along the X axis as a linear one, and visualizing it as being represented by a line 82 in a coordinate system where the vertical axis is distance along the viewing axis 22a (FIG. 1) and the horizontal axis is magnitude of the test signal X at the output of divider circuit 72 (FIG. 4). If the slope m of the line 82 is known, then any arbitrary point on the line 82 has a Z' coordinate which is the product of the slope m and the X coordinate of that point. If the coordinate Z' of this point is to be expressed as a vertical distance from some arbitrary horizontal reference rather than as a distance from the origin of the coordinate system, then an elevation signal b is added. Assuming for simplicity that the axis Z' in FIG. 5 and the output of the adder 78 in FIG. 4 are in the same units, one way to derive the necessary values of the signals m and b is a position a workpiece surface at a known level $Z_0'$ and to derive a test signal $X_0$ at the output of divider circuit 72, which test signal $X_0$ is stored in a suitable storage device (not shown). The workpiece surface is then moved to another known level $Z_1'$ and another test signal $X_1$ is derived from the output of divider 72 and suitably stored. The test signal components m and b are then derived in accordance with the expressions $$m = (Z_0' - Z_1')/(X_0 - X_1) \quad (1)$$

$$b = (Z_1'X_0 - Z_0'X_1)/(Y_0 - X_1) \quad (2)$$

The signals $X_0$ and $X_1$ are the respective outputs of divider 72 (FIG. 4) for two known positions of a workpiece surface. The signals $Z_0'$ and $Z_1'$ represent, respectively, these two known positions (with respect to a selected reference level). The reference signal components m and b are derived in any suitable way in accordance with the expression above, and may be weighted by suitable scaling constants to conform them to the units in which the measurement signal Z is to be expressed. Then, electrical signals are generated as a function of the derived values of m and b, and are stored in the storage devices 74a and 74b, respectively, in the form of electrical signals.

As an alternative to the embodiment discussed in connection with FIGS. 1-4, the invention may be implemented as a special purpose machine using, in the configuration of FIG. 1, a specially programmed digital computer in place of the circuits 24 through 30. Any suitable computer may be used, for example, suitable configurations of the Nova or Eclipse families of systems made by Data General Corporation.

Figure 6:
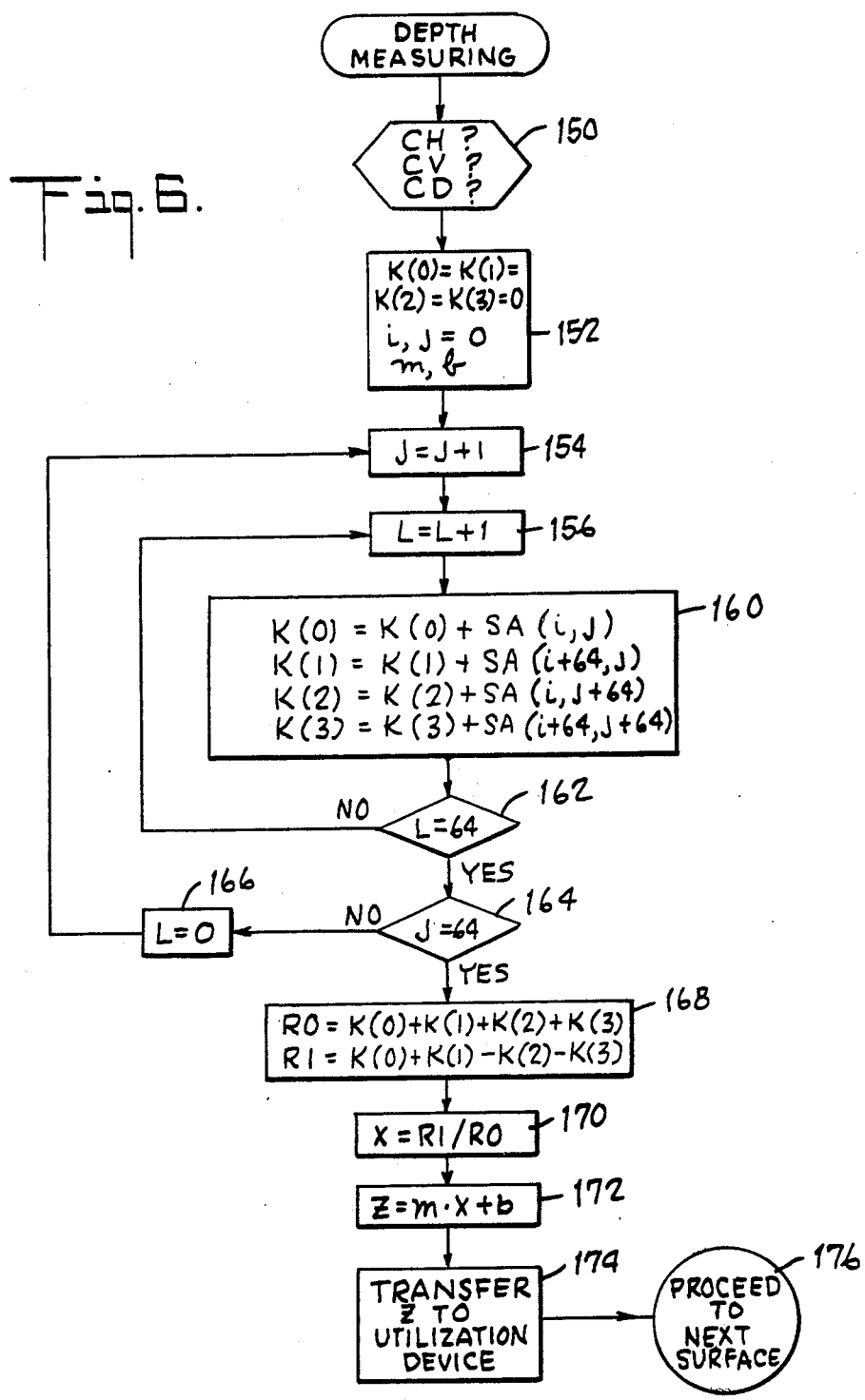
FIG. 6 is a flow chart illustrating a method of operation of the invention.

The procedure for finding the position of workpiece surface relative to a reference, once the reference signal made up of its components m and b is known, is illustrated in FIG. 6. It is assumed that the initial electrical signals provided by the illumination measuring device 22 are available and each is identified by the indices i and j where each ranges from 1 through 128. Initially, a step 150 is normally performed in which the system is conditioned to carry out a measurement based on movement of the illuminated spot 20 along the X direction or along some other direction. For simplicity, only movement along the X direction is discussed here, it being understood that the system can be adapted to work, in the alternative, with movement of the spot along the Y direction. For such movement along the Y direction $R_1$ is equal to $(K_0+K_2)-(K_1+K_3)$. Still alternatively, the system can be adapted for movement along a diagonal direction, in which case $R_1$ is equal to $(K_0+K_3)-(K_1+K_2)$. At step 152 of the procedure, each of variables K(0) through K(3) is set to 0 and each of indices i and j is also set to 0. In the same step, values for the reference signal components m and b are provided. At steps 154 and 156, the indices j and i respectively are incremented by 1 so as to point to the initial electrical signal for the pixel having X,Y coordinates 0,0. At step 160, the variable K(0) is set to the sum of its previous value and the initial electrical signal of the sample array identified by the current values of the indices i and j. Similarly, the variables K(1), K(2) and K(3) are set as indicated. At step 162, a test is made to see if the index i has reached the value 64. If the answer is no, this means that the system is considering pixels which are to the left (in FIG. 3) of the respective right-hand margins of the respective quadrants, and the index i is incremented at step 156 and step 160 is repeated. When the answer to the test 162 is affirmative, a test is made at 164 to see if the index j has reached the value 64, i.e., to see whether the system has reached the bottom margins of the respective quadrants of FIG. 3. If the answer is no, the index i is set to 0 at 166, to return to the left-hand margins of the respective quadrants of FIG. 3, the index j is incremented at 154 and the system again proceeds through steps 156, 160, 162 and 164. When the answer to the test at 164 is affirmative, the system proceeds to step 168 where the variables $R_0$ and $R_1$ are set to the respective indicated quantities. At step 170, the test signal X is derived as indicated and at step 172 the measurement signal Z is derived as indicated. The measurement signal from step 172 is transferred to a utilization device at 174; the system then proceeds at 176 to the next workpiece surface to find its position relative to a reference. The system is arranged to shut itself off when there are no more surfaces to process.

The special purpose machine discussed in connection with FIG. 6 may be used to derive the components m and b of the reference signal supplied at step 152 as discussed earlier. This is done in a procedure designated CALIBRATE and illustrated in FIG. 7. One way of proceeding through this procedure is to position a reference workpiece surface in a known position at which the illuminated spot is at the center of the field of view of the device 22. In this position the eliptical spot 20 shown in FIG. 3 is centered at the intersection of the dashed lines separating the four quadrants $K_0$-$K_3$. The procedure starts at step 100 which is similar to step 150 discussed in connection with FIG. 6. Assuming that, for simplicity, only the operation in which the spot moves along the X axis is to be calibrated, i.e., CALH in block 100, the procedure goes to step 102 at which an index n is set to 0, to indicate that this run through the procedure corresponds to the case where the illuminated spot is at the center of the field of view of the device 22. At step 104, each of the variables K(0) through K(3) is set to 0, and each of indices i and j is also set to 0. At step 106, the index j is incremented by 1 and at step 108, the index i is incremented by 1. At step 110, the variables K(0) through K(3), corresponding respectively to the quadrants $K_0$-$K_3$, are evaluated as indicated, and at step 112 a test is made to find if the index i has reached a value of 64, i.e., to find if the right-hand margin of the relevant quadrants has been reached. If the answer is no, the procedure returns to step 108, to increment the index i and again goes through steps 110 and 112. When the answer at 112 is yes, the procedure goes on to step 114 to find if the index j has reached the value of 64, i.e., to find if the bottom margin of the relevant quadrants had been reached. If the answer is no, the index i is reset to 0 at step 116 and the procedure returns to step 106, to increment the index j, and again goes through steps 108 through 114. When the answer at step 114 is yes, the procedure goes on to step 118 to evaluate the variables R(0) and R(1) based on the indicated relationships of the variables K(0) through K(3). At step 120, a test is made to find if the index n is 0. If the answer is yes, this means that the procedure is concerned with the case where the illuminated spot is at the center of the field of view of the device 22, and the procedure goes to step 122 where the variable X(0) is evaluated based on the indicated relationship and the index n is incremented by 1. The procedure then goes to step 124 where a test is made to see if the previously derived value of the variable X(0) is within a certain small range of 0. X(0) should be equal to 0 (within system tolerances) because the illuminated spot 20 should be at the center of the field of view and the difference between the illumination of its left half and that of its right half should be 0. If the answer at step 124 is no, the operator of the system readjusts the height of the reference workpiece surface to try to center the illuminated spot 20 better and the system returns to step 102. If the answer at step 124 is yes, the system returns to step 104 (but now the index n has a value of 1, to indicate that the reference workpiece surface has been moved to another known position). The system then proceeds through step 120 as discussed above but, of course, in connection with the new position of the reference workpiece surface. Since the value of the index n is now 1, the answer at step 120 is no, and the system proceeds to step 126, where the quantities Z(0) and Z(1) are supplied. The quantities Z(0) and Z(1) are respectively the known position of the reference workpiece surface when the index n was 0 and when the index n was 1. At step 128, the quantities X(1), m and b are evaluated based on the indicated relationships and the calibration procedure ends, having derived a value for the two components (m and b) of the reference electrical signal discussed above. The components m and b of the reference signal are used at step 152 of FIG. 6 or are stored, as electrical signals, in storage devices 74a and 74b, respectively, of the system illustrated in FIG. 4.

It is noted that the illuminated spot 20 need not be at the center of the field of view of the device 22 in order to accurately derive the signal m in step 128, but that it is desirable that the spot 20 be approximately at the center of that field of view when the signal b (step 128) is being derived.

It is also noted that it is desirable that the same spot 20 be entirely within the field of view of the device 22 at all times at which device 22 takes illumination measurements. In fact, a test for this may be included in the procedure described in connection with FIG. 6 as well as in that described in connection with FIG. 7. As one example, this test involves checking the borders of the field of view of the device 22 for the presence of high intensity (i.e., illuminated) points or small areas. Such a test includes checking all pixels having X coordinates of 0 and 127 (see FIG. 3) and all pixels having Y coordinates of 0 and 127. If a certain number, say five, of adjacent ones of these pixels are found to be illuminated, this means that the spot 20 probably extends outside the field of view of the device 22. (It is desirable to conclude this only if a certain number of adjacent pixels are illuminated so as to avoid error due to the occasional spurious indication of an illuminated pixel.) If this test finds that indeed the illuminated spot 20 spills outside the field of view of the device 22, an error condition is appropriately indicated so that the operator may adjust the system accordingly, e.g., by making the illuminated spot 20 smaller and/or by shifting it horizontally.

It is additionally noted that the component b of the reference signal can be thought of as representing a nominal elevation, e.g., the elevation of the platform 12, and that it can be derived in ways other than as discussed above. It should also be appreciated that the system can be trained to work with more than one value of the component b. For example, two values of the component b can be stored in appropriate memory circuits; one representing a lower elevation of the platform 12 and one representing a higher elevation. The signal b representing the lower elevation can be used in conjunction with thicker workpieces, when the platform 12 is at its lower elevation, and the other component b can be used in conjunction with the thinner workpieces, when the platform 12 is at its higher elevation. Of course, this principle can extend to using more than two values of the component b.

It should also be appreciated that the signal $R_1$ (see FIG. 6, step 168 and FIG. 7, step 118) may be thought of as the lowest order odd component of a Walsh-Hadamard series representing the field of view of the device 22 and that somewhat higher order odd components of the series may be used instead of or in addition to the lowest order odd component discussed in detail in the description above. As an additional comment, it should be clear that the array of pixels need not be a 128×128 array and that any other suitable lower or higher number of pixels may be used, and that the array need not be a square one.

The measurement signal derived at the output of adder circuit 78 in the embodiment illustrated in FIG. 4, or derived at step 172 of the procedure described in connection with FIG. 6 can be used to drive a suitable display (and/or recording) device, such as a CRT display or an analog or digital signal recorder. Of course, the measurement signal can be converted to the format appropriate to the display or recording device by the use of known techniques. Typically, the measurement signal is used as a control signal by a utilization device which, for example, includes a threshold circuit which receives the measurement signal and produces a "reject" signal when the measurement device is below a certain level and an "accept" signal when the measurement signal is above that level. The utilization device may further include an electromechanical arm responsive to a "reject" signal to move the relevant workpiece to one bin and responsive to an "accept" signal to move the relevant workpiece to another bin. Alternately, the utilization device is a sorting device which receives the measurement signal and sorts the workpieces into several categories corresponding to several different ranges of the measurement signal. Of course, other arrangements are possible and are intended to be within the scope of the invention.

While the present invention has been described in considerable detail, it is understood that various changes and modifications will occur to those skilled in the art without departing from the spirit and scope of the appended claims.

I claim:

1. A method of finding the position of a workpiece surface or the like relative to a reference, comprising the steps of:

positioning a reference workpiece surface at each of two known positions relative to the reference;

at each of said known positions, illuminating a spot of the workpiece surface with a radiant energy beam, remotely detecting the illumination at each of a number of small areas of the reference workpiece surface to produce respective initial signals related to the illumination levels at the respective small areas;

converting the initial signals derived at each of said two known positions into a reference signal which is a function of the difference in overall illumination between selected larger areas of the reference workpiece surface at each of its two known positions;

illuminating a spot of the workpiece surface with a radiant energy beam;

remotely detecting the illumination at each of a number of small areas of the workpiece surface;

generating respective initial signals related to the detected illumination levels at the respective small areas of the workpiece surface;

converting said initial signals pertaining to said workpiece into a test signal which is a function of the difference in overall illumination between selected larger areas of the workpiece surface, the geometric relationship between the radiant energy beam and the workpiece being such that the illuminated spot moves along the workpiece surface with movement of that surface relative to the reference along a measurement direction; and combining the test signal and the reference signal to produce a measurement signal indicative of the position of the workpiece surface relative to the reference.

2. A method as in claim 1, in which the step of converting initial signals into a test signal comprises converting the initial signals into a test signal which is a function of both the difference in overall illumination between the selected larger areas of the workpiece surface and the overall illumination of the entire area made up of said selected areas, such that said test signal is substantially independent of said overall illumination of said entire area.

3. A method as in claim 2, in which the step of converting initial signals into a test signal further includes finding the difference in the overall illumination between said selected larger areas of the workpiece surface and normalizing said difference by dividing it by the overall illumination of the entire area made up of said selected larger areas.

4. A method as in claim 1 in which there are two larger areas, one including half the small areas and the other including the remaining half of the small areas.

5. A method as in claim 4 in which the test signal is a function of the difference between the overall illumination of said two larger areas normalized for the sum of the overall illumination of said two larger areas.

6. A method as in claim 1 in which each of the larger areas includes a respective plurality of the small areas, the overall illumination of each of the respective larger areas is derived by accumulating the initial signals related to the respective small areas included in said larger area, and said difference in overall illumination is derived by accumulating the overall illumination of a first portion and of a second portion of the larger areas and reducing one of the two last recited accumulations by the other.

7. A method as in claim 1 in which said reference signal includes a component indicative of the proportionality of change in the overall illumination between said selected larger areas of the reference workpiece surface to movement of that surface along the measurement direction between the two known positions and a component representative of a reference elevation.

8. A method as in claim 1 in which the measurement signal changes linearly with movement of the workpiece surface relative to the reference along the measurement direction and said reference signal includes a component related to the proportionality of said change.

9. A method as in claim 1 further including the step of using said measurement signal as a control signal representative of the sought position of the workpiece surface.

10. Apparatus for finding the position of a workpiece surface or the like relative to a reference, comprising:
means for positioning a reference workpiece surface at each of two different known positions relative to the reference;
means for illuminating a spot of the reference workpiece surface with a radiant energy beam at each of said known positions, and for subsequently illuminating a spot of the workpiece;
means for remotely detecting the illumination at each of a number of small areas of the illuminated surface;
means for producing respective initial signals related to the illumination levels at the respective small areas of the reference workpiece;
means for converting the initial signals produced for each of said two known positions into a reference signal which is a function of the difference in overall illumination between selected larger areas of the reference workpiece surface at each of its two known positions;
means for producing respective initial signals related to the illumination levels at the respective small areas of the workpiece surface;
means for converting said initial signals pertaining to said workpiece into a test signal which is a function of the difference in overall illumination between selected larger areas of the workpiece surface, the geometric relationship between the radiant energy beam and the workpiece being such that the illuminated spot moves along the workpiece surface with movement of that surface relative to the reference along a measurement direction; and
means for combining the test signal and the reference signal to produce a measurement signal indicative of the position of the workpiece surface relative to the reference.

11. Apparatus as in claim 10 wherein the means for converting the initial signals to a test signal comprises means for converting the initial signals into a test signal which is a function of both the difference in overall illumination between the selected larger areas of the workpiece surface and the overall illumination of the entire area made up of said selected areas, such that said test signal is substantially independent of said overall illumination of said entire area.

12. Apparatus as in claim 11 wherein the means for converting the initial signals to a test signal further includes means for finding the difference in the overall illumination between said selected larger areas of the workpiece surface and means for normalizing said difference by dividing it by the overall illumination of the entire area made up of said selected larger areas.

13. Apparatus as in claim 10 wherein there are two larger areas, one including half the small areas and the other including the remaining half of the small areas.

14. Apparatus as in claim 13 wherein the test signal is a function of the difference between the overall illumination of said two larger areas normalized for the sum of the overall illumination of said two larger areas.

15. Apparatus as in claim 10 wherein each of the larger areas includes a respective plurality of the small areas, and wherein said apparatus further includes means for deriving a signal representing the overall illumination of each of the respective larger areas comprising means for accumulating the initial signals related to the respective small areas included in the respective larger area, means for accumulating the signals representing the overall illuminations of a first portion and of a second portion of the larger areas, and means for reducing one of the two last recited signals by the other.

16. Apparatus as in claim 10 wherein the measurement signal changes linearly with movement of the workpiece surface relative to the reference along the measurement direction and said reference signal includes a component related to the proportionality of said change.

17. Apparatus as in claim 10 further including means for using said measurement signal as a control signal representative of the sought position of the workpiece surface.

* * * * *

UNITED STATES PATENT AND TRADEMARK OFFICE
CERTIFICATE OF CORRECTION

PATENT NO. : 4,329,060
DATED : May 11, 1982
INVENTOR(S) : Joseph Wilder

It is certified that error appears in the above-identified patent and that said Letters Patent are hereby corrected as shown below:

On the title page:
In the References Cited:

U.S.P.N. 3,997,795, "Pohl" should read -- Pohl et al --.

Column 6, line 44, "a position" should read -- to position --.

In the Drawings:

Fig. 4, "x=63-127" in accumulator 62 should read -- x=64-126 --.

Fig. 6, "L=L+1" in Step 156 should read -- i=i+1 --.

Fig. 6, "L=64" in Step 162 should read -- i=64 --.

Fig. 6, "L=0" in Step 166 should read -- i=0 --.

Figure 7:
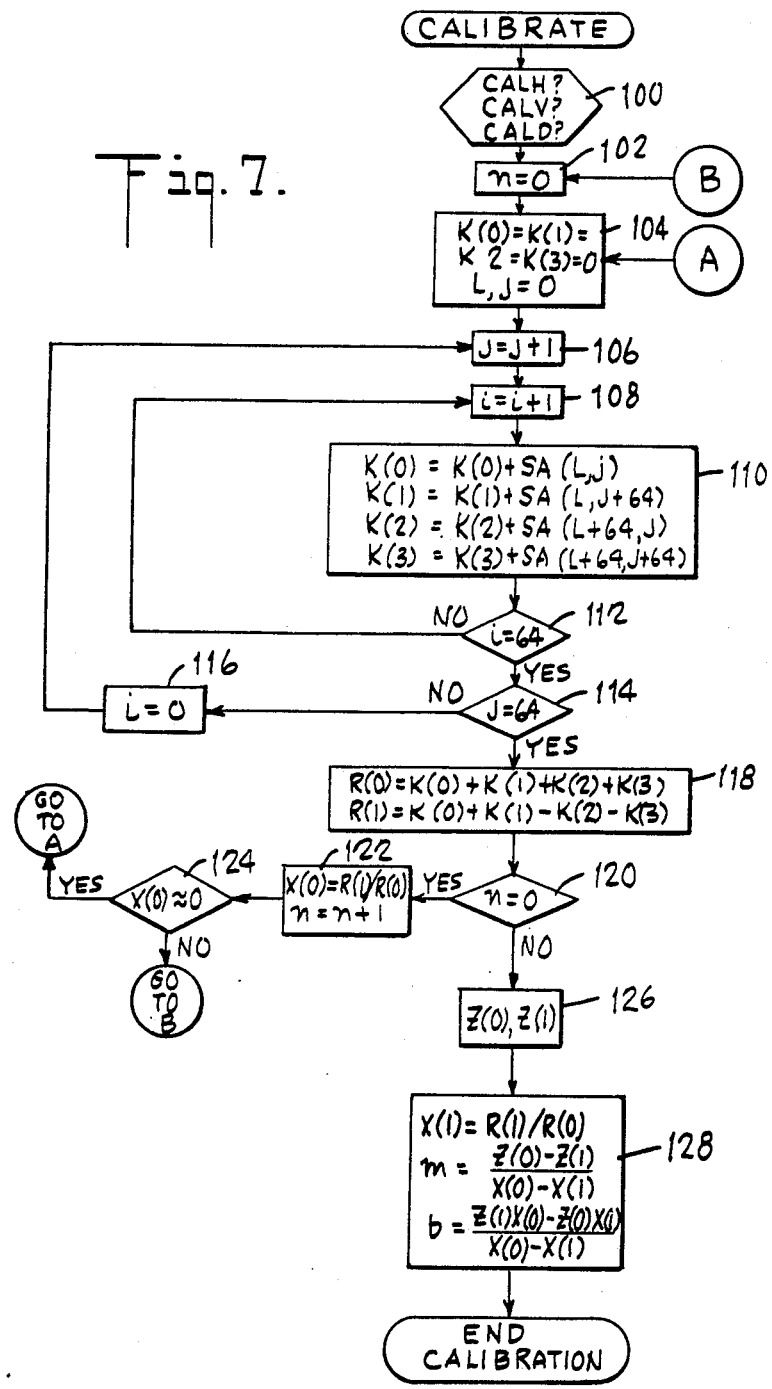
FIG. 7 is a flow chart illustrating a part of the method of FIG. 6.

Fig. 7, "L,j=0" in Step 104 should read -- i,j=0 --.

Fig. 7, in Step 110 "L" in all instances should read -- i --.

Signed and Sealed this

Seventh Day of September 1982

[SEAL]

Attest:

GERALD J. MOSSINGHOFF

*Attesting Officer*  *Commissioner of Patents and Trademarks*